US007861275B1

(12) United States Patent
Vellaikal et al.

(10) Patent No.: US 7,861,275 B1
(45) Date of Patent: Dec. 28, 2010

(54) MULTICAST DATA SERVICES AND BROADCAST SIGNAL MARKUP STREAM FOR INTERACTIVE BROADCAST SYSTEMS

(75) Inventors: Asha Vellaikal, Santa Monica, CA (US); Yongguang Zhang, Moorpark, CA (US); Son K. Dao, Northridge, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/536,276

(22) Filed: Mar. 27, 2000

Related U.S. Application Data

(60) Provisional application No. 60/130,676, filed on Apr. 23, 1999.

(51) Int. Cl.
*H04N 7/173* (2006.01)
(52) U.S. Cl. .................. 725/109; 725/110; 725/112
(58) Field of Classification Search ......... 725/109–112, 725/67–68, 39, 98, 118, 131, 148, 151, 135–142; 370/485–486; 715/758
See application file for complete search history.

(56) References Cited

U.S. PATENT DOCUMENTS

| 5,425,027 | A | * | 6/1995 | Baran ...................... 370/395.6 |
| 5,481,542 | A | * | 1/1996 | Logston et al. ............. 725/131 |
| 5,557,724 | A | * | 9/1996 | Sampat et al. ................ 725/43 |
| 5,619,250 | A | * | 4/1997 | McClellan et al. .......... 725/132 |
| 5,682,195 | A |   | 10/1997 | Hendricks et al. |
| 5,694,163 | A | * | 12/1997 | Harrison .................... 725/110 |
| 5,708,845 | A |   | 1/1998 | Wistendahl et al. ......... 395/806 |
| 5,712,906 | A |   | 1/1998 | Grady et al. |
| 5,734,413 | A |   | 3/1998 | Lappington et al. |
| 5,778,187 | A | * | 7/1998 | Monteiro et al. ............ 709/231 |
| 5,793,365 | A | * | 8/1998 | Tang et al. .................. 715/758 |
| 5,808,662 | A | * | 9/1998 | Kinney et al. .............. 348/14.1 |
| 5,818,935 | A | * | 10/1998 | Maa ........................... 380/200 |
| 5,828,839 | A |   | 10/1998 | Moncreiff |
| 5,832,229 | A | * | 11/1998 | Tomoda et al. .............. 709/227 |

(Continued)

FOREIGN PATENT DOCUMENTS

EP          0837599          4/1998

(Continued)

OTHER PUBLICATIONS

Anhalt, Von Niels et al., "Interaktives video Im Internet", Oct. 15, 1998.

(Continued)

*Primary Examiner*—Son P Huynh

(57) ABSTRACT

A system and method for producing and receiving interactive broadcasting having a broadcast signal with a hypermedia channel and a logical multicast data channel. The logical multicast data channel has a broadcast signal markup stream (BSMS). The system users have a receiver with an interactivity module and a communication module. The BSMS allows user selectable objects to be displayed to users of the system. BSMS objects can be generated by combining speech recognition, language (and optionally video) processing, and keyword searches. By selecting objects various information relating to those objects may be displayed to users. A portion of the logical multicast channel may be employed to provide interactivity between users. A variation eliminates the BSMS either by employing a markup stream server to provide access links or by generating link content directly in the receiver by the same process.

42 Claims, 3 Drawing Sheets

U.S. PATENT DOCUMENTS

| | | | | |
|---|---|---|---|---|
| 5,929,849 | A | 7/1999 | Kikinis | 345/327 |
| 6,002,768 | A * | 12/1999 | Albanese et al. | 713/175 |
| 6,005,562 | A * | 12/1999 | Shiga et al. | 345/721 |
| 6,005,921 | A * | 12/1999 | Keefe et al. | 379/29.06 |
| 6,006,256 | A * | 12/1999 | Zdepski et al. | 725/114 |
| 6,018,764 | A * | 1/2000 | Field et al. | 709/217 |
| 6,018,768 | A * | 1/2000 | Ullman et al. | 709/218 |
| 6,029,045 | A * | 2/2000 | Picco et al. | 725/34 |
| 6,061,716 | A * | 5/2000 | Moncreiff | 709/204 |
| 6,061,719 | A * | 5/2000 | Bendinelli et al. | 709/218 |
| 6,064,420 | A * | 5/2000 | Harrison et al. | 725/136 |
| 6,081,830 | A * | 6/2000 | Schindler | 709/204 |
| 6,124,854 | A * | 9/2000 | Sartain et al. | 715/716 |
| 6,133,913 | A * | 10/2000 | White et al. | 345/719 |
| 6,184,878 | B1 * | 2/2001 | Alonso et al. | 725/109 |
| 6,205,485 | B1 * | 3/2001 | Kikinis | 709/231 |
| 6,233,618 | B1 * | 5/2001 | Shannon | 709/229 |
| 6,240,073 | B1 * | 5/2001 | Reichman et al. | 370/319 |
| 6,240,555 | B1 * | 5/2001 | Shoff et al. | 725/110 |
| 6,249,914 | B1 * | 6/2001 | Harrison et al. | 725/141 |
| 6,263,505 | B1 * | 7/2001 | Walker et al. | 725/110 |
| 6,275,989 | B1 * | 8/2001 | Broadwin et al. | 725/37 |
| 6,289,389 | B1 * | 9/2001 | Kikinis | 709/239 |
| 6,317,885 | B1 * | 11/2001 | Fries | 725/109 |
| 6,324,182 | B1 * | 11/2001 | Burns et al. | 370/429 |
| 6,332,120 | B1 * | 12/2001 | Warren | 704/235 |
| 6,348,932 | B1 * | 2/2002 | Nishikawa et al. | 345/719 |
| 6,351,467 | B1 * | 2/2002 | Dillon | 370/432 |
| 6,377,981 | B1 * | 4/2002 | Ollikainen et al. | 709/217 |
| 6,385,647 | B1 * | 5/2002 | Willis et al. | 709/217 |
| 6,389,593 | B1 * | 5/2002 | Yamagishi | 725/9 |
| 6,392,664 | B1 * | 5/2002 | White et al. | 715/717 |
| 6,421,706 | B1 * | 7/2002 | McNeill et al. | 709/204 |
| 6,442,590 | B1 * | 8/2002 | Inala et al. | 709/204 |
| 6,459,427 | B1 * | 10/2002 | Mao et al. | 725/109 |
| 6,502,243 | B1 * | 12/2002 | Thomas | 725/110 |
| 6,510,557 | B1 * | 1/2003 | Thrift | 725/110 |
| 6,522,342 | B1 * | 2/2003 | Gagnon et al. | 345/716 |
| 6,526,580 | B2 * | 2/2003 | Shimomura et al. | 725/63 |
| 6,536,041 | B1 * | 3/2003 | Knudson et al. | 725/39 |
| 6,545,722 | B1 * | 4/2003 | Schultheiss et al. | 348/552 |
| 6,560,777 | B2 * | 5/2003 | Blackketter et al. | 725/110 |
| 6,571,392 | B1 * | 5/2003 | Zigmond et al. | 725/110 |
| 6,577,328 | B2 * | 6/2003 | Matsuda et al. | 715/757 |
| 6,601,103 | B1 * | 7/2003 | Goldschmidt Iki et al. | 709/231 |
| 6,614,843 | B1 * | 9/2003 | Gordon et al. | 375/240.01 |
| 6,615,257 | B2 * | 9/2003 | Lee et al. | 709/222 |
| 6,637,032 | B1 * | 10/2003 | Feinleib | 725/110 |
| 6,675,385 | B1 * | 1/2004 | Wang | 725/39 |
| 6,751,656 | B2 * | 6/2004 | Kohda et al. | 709/219 |
| 6,766,374 | B2 * | 7/2004 | Trovato et al. | 709/227 |
| 6,772,436 | B1 * | 8/2004 | Doganata et al. | 725/106 |
| 6,785,905 | B1 * | 8/2004 | Nishioka et al. | 725/110 |
| 6,802,076 | B1 * | 10/2004 | Terakado et al. | 725/38 |
| 6,810,526 | B1 * | 10/2004 | Menard et al. | 725/46 |
| 6,886,178 | B1 * | 4/2005 | Mao et al. | 725/52 |
| 7,036,083 | B1 * | 4/2006 | Zenith | 715/758 |
| 7,143,428 | B1 * | 11/2006 | Bruck et al. | 725/37 |
| 7,577,979 | B2 * | 8/2009 | Feinleib et al. | 725/114 |
| 2001/0014914 | A1 * | 8/2001 | Muramatsu et al. | 709/224 |
| 2002/0004808 | A1 * | 1/2002 | Marks et al. | 707/530 |
| 2002/0007374 | A1 * | 1/2002 | Marks et al. | 707/513 |
| 2002/0007494 | A1 * | 1/2002 | Hodge | 725/109 |
| 2002/0048275 | A1 * | 4/2002 | Atwater et al. | 370/409 |
| 2003/0115612 | A1 * | 6/2003 | Mao et al. | 725/136 |
| 2003/0146940 | A1 * | 8/2003 | Ellis et al. | 345/811 |
| 2003/0149988 | A1 * | 8/2003 | Ellis et al. | 725/87 |
| 2003/0206554 | A1 * | 11/2003 | Dillon | 370/432 |
| 2004/0107439 | A1 * | 6/2004 | Hassell et al. | 725/44 |
| 2004/0117831 | A1 * | 6/2004 | Ellis et al. | 725/53 |
| 2005/0262542 | A1 * | 11/2005 | DeWeese et al. | 725/106 |
| 2005/0283800 | A1 * | 12/2005 | Ellis et al. | 725/40 |

FOREIGN PATENT DOCUMENTS

| | | |
|---|---|---|
| EP | 1147659 | 5/2003 |
| JP | 02000197032 A * | 7/2000 |
| WO | WO 99/14953 | 9/1998 |
| WO | WO 98/43432 | 10/1998 |
| WO | WO 98/47284 | 10/1998 |
| WO | WO 99/15968 | 4/1999 |
| WO | WO 99/16201 | 4/1999 |
| WO | WO 99/18703 | 4/1999 |
| WO | 99/51030 A1 | 10/1999 |
| WO | WO 0013416 * | 3/2000 |

OTHER PUBLICATIONS

Wugofski, Ted, "A Modular Hypertext Markup Language for Broadcast Applications", Oct. 1, 1998, Over the Moon Productions/Gateway.

EPO Communication dated Nov. 5, 2009 in European Patent Application No. 00108857.4 filed Apr. 26, 2000 by Asha Vellaikal et al.

EPO Communication dated Apr. 7, 2008 in European counterpart Application No. 00108857.4 of corresponding U.S. Appl. No. 09/536,276, filed Mar. 27, 2000 by Asha Vellaikal et al.

* cited by examiner

MULTICAST DATA SERVICES AND BROADCAST SIGNAL MARKUP STREAM FOR INTERACTIVE BROADCAST SYSTEMS

RELATED APPLICATION

The present invention claims priority to provisional application 60/130,676 filed on Apr. 23, 1999.

TECHNICAL FIELD

The present invention generally relates to interactive broadcasting and more particularly to systems for producing interactive broadcasts.

BACKGROUND ART

Traditionally, television has been a passive form of entertainment, with very limited modes of interactivity. Currently there exists no means by which a user can interact with the broadcast signals to access information related to the broadcast content or trigger other sophisticated functions. This is especially unfortunate in the current information age where there has been an explosion of information about countless topics in various forms. The personal computer has recently become the preferred device for information access, mainly due to the increasing popularity and growth of the Internet. Thus, the user typically has to either subscribe to an information service provider or have direct access to the Internet. In such a scenario, if the user is interested in gathering information related to television content, independent searches on available information services must be conducted.

To avoid this cumbersome procedure and enrich the television content, a simpler system for user interaction with broadcast signals and direct information transmission is necessary. The anticipated merging of the television and the Personal Computer (PC) as a single source for entertainment and information will facilitate any implementation of the invention presented here. For example, PCs that are enabled to receive broadcast signals are recently available. In addition, the relatively inexpensive "Web PC" is another example of a device that augments ordinary television. Apart from these devices, communication networks capable of carrying high bandwidth data will soon be available to homes, enabling interactive broadcast systems. These advances in infrastructure call for new methods that will facilitate and utilize the marriage between entertainment and information access devices.

Interactive television includes several different applications such as video-on-demand, home shopping, and others. Using interactive television the users have complete control to allow them to specify different actions such as the choice of a movie to be shown or item to purchase. Several different system architectures have been proposed for such systems. However, these require tremendous technological advances in the areas of communications and networking, video servers, etc. and a large investment in infrastructure such as laying new cable to individual homes.

Markup languages such as HTML have been used to enrich standard text documents into hypertext format by including tags that precede and follow logical portions of the document. When the hypertext document is parsed, the markup tags can be separated from the surrounding data and these markup statements contain the information such as hyperlinks, anchors and annotations which will help the hypertext functions (such as database access), representation schemes and interface modalities. Hypermedia has also been proposed in which elements such as text, graphics, speech, pictures and animation can be networked together. Hypermedia can also be loosely defined as multimedia data with hyperlinks.

Ordinary television broadcast signals only contain video and audio information producing a very passive medium of entertainment with limited methods of interactivity. In recent years, a limited amount of interactivity has been provided by adding information into the broadcast signals. Wink® communications include additional relevant data into the television signal such as sports statistics, or movie information that can be activated by the viewer. Intercast®, Hypercast® and certain other systems insert web data into the video and audio stream. However, these systems do not allow viewers to interact among themselves and consequently watching a movie at home is never akin to a theater experience due to the lack of audience interaction. Additionally, all of these systems result in multiple users requesting the same data from the web server simultaneously creating a tremendous load on the server and the network. Therefore, there is a need for a system and method by which the broadcast media can be made active and the user can then interact with the signals.

SUMMARY OF THE INVENTION

One aspect of the proposed invention is the addition of a new broadcast signal markup stream (BSMS) to the broadcast signals. This additional stream contains data that will convert the video and audio streams into hypermedia streams. Like hypertext documents, this additional information can contain annotation, links and other information useful to the user which can be enabled by simple clicks of a specialized remote control in order to initiate some action such as the retrieval of associated documents over a communications channel. This scheme also meshes naturally with the MPEG-4 based compression standard.

In a further aspect of the invention, a method of broadcasting comprising the steps of identifying and specifying selectable objects from a broadcast signal;

generating a markup stream containing the object; and broadcasting an interactive broadcast signal comprising the markup stream.

One purpose of the invention is to make broadcast signals into a richer source of information and to allow the user to interact with the broadcast signals, thereby enabling an interactive viewing experience. One advantage of the invention is that it will not require major hardware changes to the existing infrastructure. In addition, it does not require excessive storage at the user end as is common in many interactive television systems. The overhead that is required in additional data bandwidth by the new data stream is very small. Also, the scheme is exceptionally compatible with the MPEG-4 compression standard, although still possible using the MPEG-1 and MPEG-2 standards.

The present invention provides a television viewer with a high degree of interactivity in terms of communicating with other viewers as well as getting additional information from other sources, such as the Internet.

These and other features and advantages of the present invention will be apparent to those skilled in the art from the following detailed description of preferred embodiments, taken together with the accompanying drawings.

DESCRIPTION OF THE PREFERRED EMBODIMENTS

Figure 1:
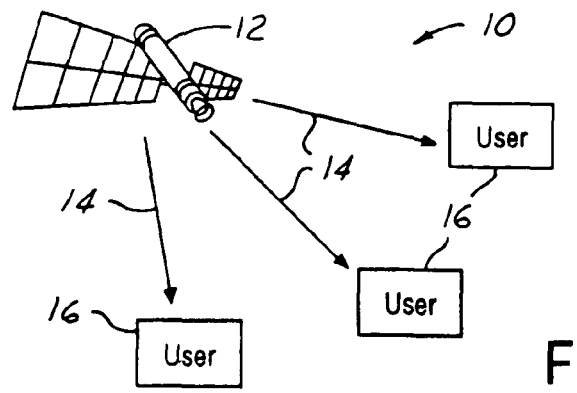
FIG. 1 is a high level block diagram of a current broadcasting model.

In the following description, the same reference numerals are used to identify identical components. The following description is directed to a satellite-based system. The teaching of the present invention may be applied to conventional broadcast systems or be incorporated in conventional broadcast systems.

Referring to FIG. 1, a known satellite broadcast system 10 is illustrated. System 10 includes a satellite 12 that is used to generate broadcast signals 14 to users 16. As is illustrated the signals are broadcast from satellite 12 to the users. No interaction is performed by the users.

Figure 2:
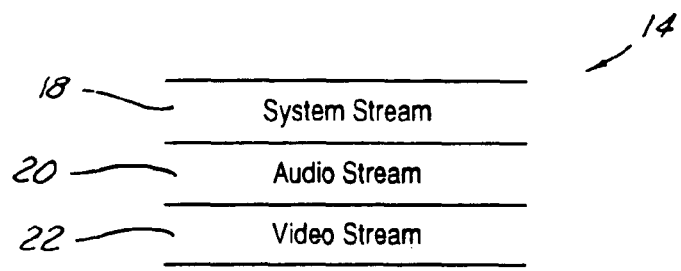
FIG. 2 is a diagram illustrating a typical broadcast signal.

Referring now to FIG. 2, known broadcast signal 14 only contains enough information to output a video image and synchronized audio. Broadcast signal 14 consists of a system level stream 18, a video stream 20 and an audio stream 22. Typically, the video and audio data will be in a compressed format while the system stream will contain the synchronization information. Some signals will also contain closed caption information.

Figure 3:
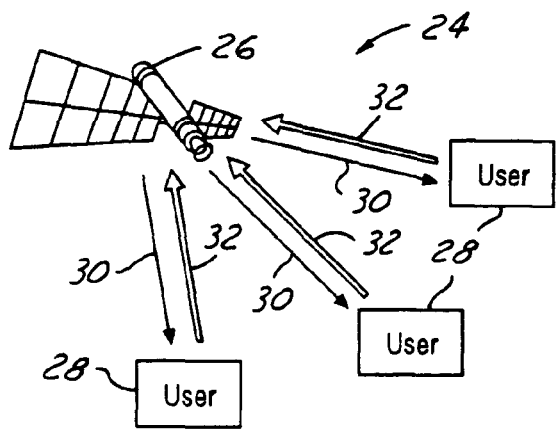
FIG. 3 is a high level block diagram of an interactive broadcasting model according to the present invention.

Referring now to FIG. 3, an interactive satellite broadcast system 24 according to the invention is illustrated. System 24 has a satellite 26 capable of both sending and receiving signals to and from users 28. Satellite 26 generates broadcast signals 30 modified from those above. Users generate a return signal 32 to communicate with satellite 26 and interact with the remainder of the system as will be described below.

Figure 4:
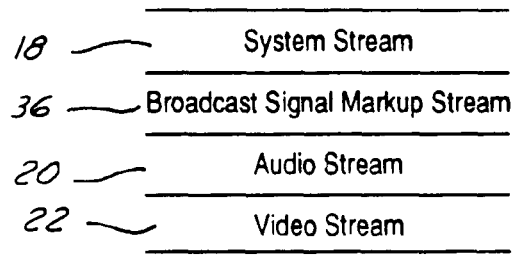
FIG. 4 is a diagram illustrating the broadcast signal including the broadcast signal markup stream according to the present invention.

Referring now to FIG. 4, the broadcast signal 30 of the present invention includes system stream 18, audio stream 20 and video stream 22 as shown above in FIG. 2. An additional stream, a Broadcast Signal Markup Stream 36 (BSMS), is also transmitted along with the other streams 18, 20, 22. BSMS 36 is a computer language that can be understood by a playback device as will be further described below. BSMS 36 carries information which will allow the broadcast signals to support interactivity.

BSMS 36 contains information to serve several purposes described below:

(1) Enhancement of the video and audio information: The purpose of BSMS 36 is to carry information that can be enabled by the user to improve the viewing experience. For example, BSMS 36 may contain related information regarding a particular scene that can be activated if desired by the user; a movie scene could contain the names of the actors appearing in the scene at that moment. Closed captioning can be considered part of the markup stream, enhancing the audio stream by providing a transcript on the video screen of what is being spoken. Thus, the markup language should have provisions for including this additional information, optionally activated by the user.

(2) Identification and specification of selectable objects: The markup language has the capability of identifying and specifying selectable objects on the video screen. This is important, as there may be definite actions that are associated with these objects which are activated when the user selects that object. Some examples of selectable objects are key words spoken as well as specific parts of the video screen.

(3) Inclusion of functions related to the choice of selectable objects: In addition to being able to specify selectable objects from the media streams, the markup stream should also contain functions related to the choice of these objects. This is a significant feature of the markup stream. From the perspective of hypermedia, one of the important functions is hyperlinks, links to associated information from various sources. When the user selects an object, the related function is invoked and, in the case of hyperlinks, the associated information is retrieved and displayed.

BSMS 36 blends naturally with the standardized MPEG-4 based compression scheme. The MPEG-4 compression standard is a system for communicating audio-visual (AV) objects. Unlike earlier compression standards such as MPEG-1 and MPEG-2 which are content independent and block-based, the MPEG-4 standard utilizes an object-based coding syntax that is more suited for interactive applications. MPEG-4 includes content-based coding syntax, content-based editing, content-based access and user interaction. In the MPEG-4 architecture, one or move AV objects and their spatial-temporal relationships are transmitted from a source to an MPEG-4 decoder. At the source, the AV objects are error protected, multiplexed and transmitted downstream. At the decoder, the AV objects are de-multiplexed, error corrected, decompressed, composited and presented to the end user. It is possible for the end user to interact with the information and thus the MPEG-4 decoder possesses the functionality to provide means for user interaction. In addition, the MPEG-4 architecture allows the donwloadability of decoding tools and thus gives the content developers the flexibility to create customized bitstream structures to suit specific application needs. MPEG-4 places importance on the concepts of a video object (VO), video object layers (VOL), and video object planes (VOP). VO and VOP correspond to entities in the bitstream that the user can access and manipulate. The VO concept is naturally suited to BSMS 36. Each object on the screen can easily be associated with a specific action, like linking to a URL. Upon selection of that object (which is supported by the interactive nature of MPEG-4), the corresponding function can be activated as described earlier. The MPEG-4 committee has defined the MPEG-4 Syntax Description Language (MSDL), including a specification of classes of objects that will be used for specific applications. The AV object class consists of a public method called handle, which can be used to handle user interaction. This method can be used to analyze the stream and arrive at the corresponding action. By giving an attribute field to the MPEG-4 classes, any action can be specified as one of the attributes or properties of the object.

Unlike MPEG-4, MPEG-1 and MPEG-2 are block-based coding schemes, which do not incorporate the concept of a video object. Thus, the inclusion of BSMS 36 data with such formats is more difficult. Both schemes contain the system layer, which is traditionally used to hold multiplexing and timing information. The system stream has the provision to include private data, which can be used to carry the BSMS. However, mapping between different image elements and functions must be handled elsewhere as there is no object concept built into these coding schemes.

Multicast is used to refer to group membership information, whereby a group can consist of all viewers watching a particular channel. In IP-based multicasting, each multicast group is specified by a multicast address. It is possible to have a static multicast channel address associated with each channel. For example, channel 4 could have a multicast address of 224.0.0.4. This multicast channel is a data channel that will form the means by which the users can communicate with one another (chat type), post messages and request additional information, such as web data. In addition to this data channel, the video and audio signals will be augmented with BSMS 36, which will provide the functionality to specify links of interest and other enhancing information. For example, by using BSMS 36, it is possible to associate a link on the Internet, which is of relevance to what is being displayed. A user can activate this link to receive data that is then delivered via the multicast channel. Other users who are interest in the same data will also receive it though only a single copy has been transmitted. This considerably improves the salability of the system with respect to the available bandwidth. With the use of the BSMS 36, the video/audio channel is transformed into a semi-hypermedia channel.

Figure 5:
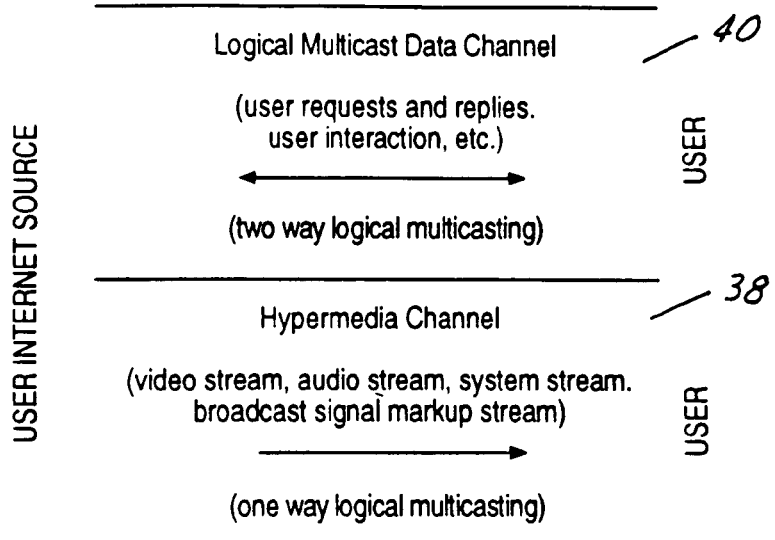
FIG. 5 is a diagram of the hypermedia and multicast data channels.

Referring now to FIG. 5, in a variant of the invention, the broadcast signal 30 is comprised of two signals. A hypermedia channel 38 and a logical multicast channel 40. The hypermedia channel 38 is a one-way broadcast from the broadcast source to the users. The BSMS 36 is contained within hypermedia channel 38. Logical multicast channel 40 is a two-way interactive channel, jointly shared by all the viewers of a particular channel. Logical multicast channel 40 accompanies each television channel to allow users to interact among themselves with limited response lag (through caching), without excessively loading the network and while keeping the system scaleable. Logical multicast channel 40 thus connects users to other users and users to the Internet.

Figure 6:
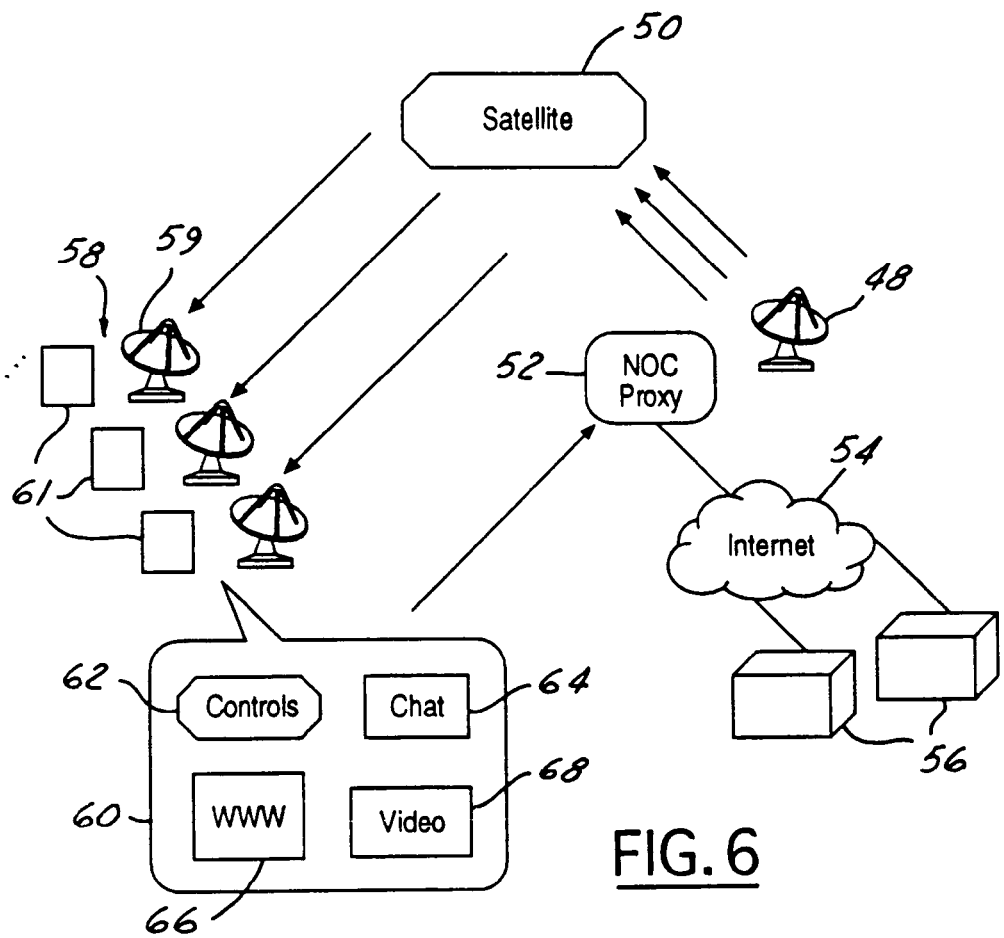
FIG. 6 is a diagram of the system architecture implemented by a satellite-based broadcast service.

Referring now to FIG. 6, the architecture of a satellite-based broadcasting system 46 is illustrated. The system 46 includes an uplink center 48 and a satellite 50 that multiplex and transmit the different channels including the video, audio and multicast data channels. A Network Operation Center (NOC) proxy 52 handles user requests and scheduling, and retrieves requested information from Internet 54 and other associated data sources 56. A receiver system 58 having an receiving antenna 59 at the client end through a control device 61 collects the broadcast data de-multiplexes them and directs them to the appropriate output devices or software, in addition to responding to user interaction and sending out requests and other data through the network connection. By way of example, receiver system 58 may include a display screen 60 including several screen indicia including a control portion 62, a chat portion 64, a World Wide Web portion 66 and a video portion 68.

The three basic elements of the system architecture are described below:

(1) Multiplexing at the Uplink Center 48: In traditional satellite television broadcasting, there is an uplink center which generates the MPEG streams corresponding to different channels, multiplexes them and transmits the data via a digital broadcast satellite. In the current architecture, the uplink center multiplexes the markup stream along with the video and audio signals as well as accept real-time interactive data from the NOC proxy 52 (for each channel) and transmit all of this in the appropriate data channels. The hypermedia channel is either stored locally or arrives in real-time from another source as with a live event. Although there is a single logical multicast channel associated with each television channel, several such data channels can be multiplexed together.

(2) NOC Proxy 52: The NOX proxy 52 is the heart of the system and provides the main coordinating function between user requests and inputs and the multicast channel. The users communicate directly to the NOC proxy 52, either through a dial-up connection or via an Internet service provider. (Although the communication will likely be based on an IP protocol, this is not required by the system.) In one embodiment, the network operations proxy is capable of receiving user input and generating a BSMS data stream therefrom.

There can be two types of user data, one simple input as in the case of a chat application or a request for some data as in the case of Internet data. In both cases the user data is encapsulated as an IP packet and transmitted to the NOC proxy 52. It is mandatory for all user data to contain the multicast address information to which the appropriate data must be forwarded. This can be transparent to the user by requiring the receiving system to automatically include the channel information into the packet. Thus, the proxy receives the packets and determines the course of action. In the case of an application where the user is just inputting data (such as in chatting), the proxy simply forwards the packet to the appropriate multicast group via the uplink center. Any filtering or moderation can be performed at this point. In the case of requests, the operation is more complicated. Consider the scenario where users request information from a particular link that was included in the BSMS 36. It is highly likely that multiple users will request the same data. In order to keep the system scalable (in both complexity and bandwidth), only one copy of the data should be downloaded from the appropriate server and multicast via the appropriate channel. Thus, the proxy has to keep track of which data has been requested or has been previously sent. In the case of data that has already been requested, the proxy can disregard the request since the data is already is transmitted in the common multicast channel as the result of another user's request. At the receiver there is a cache which stores all the data coming from the particular multicast channel tuned to. This greatly improves the performance, as the user device will send out a request only it if does not see the requested item in the cache. In order to support users who just joined a channel without a cache built-up it is important for the proxy to schedule re-transmissions of some data (e.g. data which has been transmitted in the previous minute).

(3) The Receiver System 58: The receiver system 58 performs the function of de-multiplexing and decompressing the appropriate data channel from the multiplexed video and audio streams. The de-multiplexer extracts the video and audio channels as well as the appropriate multicast channel and forwards them to the appropriate devices. In the case of the hypermedia signal, a BSMS parser will separate the markup signal streams from the video and audio signals. The compressed video and audio signals are then sent to a module that decompresses the data and renders them on the appropriate display device. The display device in this case has to be more sophisticated than a simply NTSC monitor since it also has to display data from other applications such as a chat session, web browser and so on. The user requests and interaction are performed via a specialized remote control as well as a wireless keyboard. There has to be an interactivity control device that takes the user input and performs the appropriate action, decipher the appropriate part of the markup signal or send out the user input via a communications device. In the latter case, it is necessary for the system to have a communications stack and a modem in addition to either a generalpurpose or specialized microprocessor. In addition, the system has a cache to store all incoming data for the channel that the user is currently viewing. Also, the receiver module contains a means by which the packets can be filtered based on the multicast addresses so that only packets intended for that particular channel are extracted. Detailed information on the system components is provided below.

Figure 7:
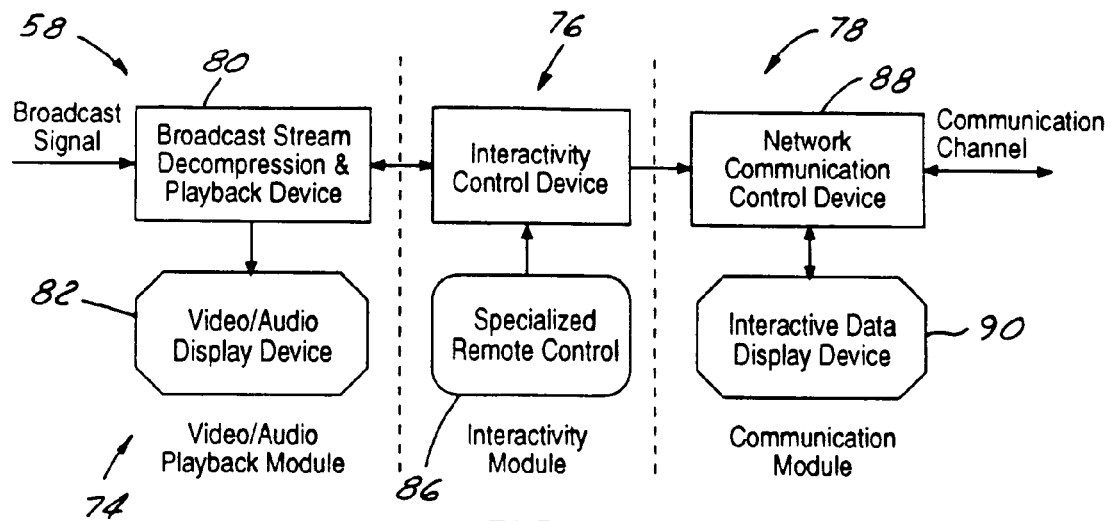
FIG. 7 is a diagram of the basic system components including the video/playback module, the interactivity module and the communication module.

Referring now to FIG. 7, receiver system may be has three main modules, the video/audio playback module 74, the interactivity module 76 and the communication module 78.

The video/audio playback module 74 consists of two devices, a decompression and playback device 80 that is coupled to a display device 82. The playback device 80 takes in the broadcast stream and subsequently demultiplexes and decompresses the user-selected channel. The decompressed video and audio streams (after being synchronized using the system level information) are then output to the video/audio display device 82. This display device 82 may be a normal television monitor with speakers. It is also possible that the display device is a broadcast signal enabled PC monitor. Note that so far this module has the same functionality set-top receiver in current broadcast systems. In addition to the above functions, the playback device 80 also passes on the markup stream to the interactivity control device that forms part of the interactivity module as will be discussed below. The playback device 80 is also capable of accepting instructions from the interactive module to modify the properties of the audio and video data being output to the display device. For example, the user might want to display extra information about the scene that is contained in the markup stream, superimposed at the top of the current display. This request is communicated by the interactivity module to the playback device along with the relevant information.

The interactivity module 76 consists of two components, the interactivity control device 84 and user control device 86. The user control device 86 is a remote control that provides the user with capabilities such as selection of a video or audio object. A user specified action such as the selection of a media object is first captured by the interactivity control device 84 and the markup stream (input to the interactivity control device by the playback device) and then parsed to locate the corresponding function. If the function involves communication with the outside world, the request is then passed on to the communication module 78. If the action involved additional information on the playback screen, the request is then passed on to the playback device along with the corresponding information. Thus, the interactivity module 76 is responsible for capturing the user actions and sending control commands to either the communication module or the playback module in order to initiate responses for the user specified functions.

The communication module 78 enables remote access to multiple information sources. Thus, this module is mainly responsible for communicating with the outside world and is linked to a communications channel. The network communication device 88 takes in the requests for remote information from the interactivity control device 90 and the request is sent out through the communications channel. This device also manages the data that has been retrieved in response to the request and directs them appropriately to an interactive display device. The interactive display device 90 may be identical with the playback device, as in the case of a broadcast enabled PC. Apart from a monitor for display, this device can also contain associated peripherals, such as keyboard or mouse for greater interactivity.

In hypermedia, information is linked with more information from various different sources. The related information can be of different data types, e.g. video from a video server information from the World Wide Web (WWW), audio from a multimedia repository. For example, a clip from the daily news might have links to previous video broadcast information regarding the same topic. These broadcasts can be compressed and stored in a video server at a particular site. The new broadcast can contain links to the old broadcast information that can be retrieved by the user if desired. Similarly, an advertisement can contain links to the WWW site of the company whereby the user can gather more information regarding the advertised product. In this scheme, broadcast material producer predefined the information links. Sacrificing some flexibility, the scheme offers the user access to related information with very little effort.

Imagemaps are commonly used in hypertext documents today, enabling different URLs to be linked with different parts of an image. In a similar manner, it is possible to map the broadcast video screen such that for a given frame, different part of the screen will have different actions associated with it. Thus, the markup stream should contain methods to specify different portions of the image and a method to annotate an action along with the selection of that object.

Figure 8:
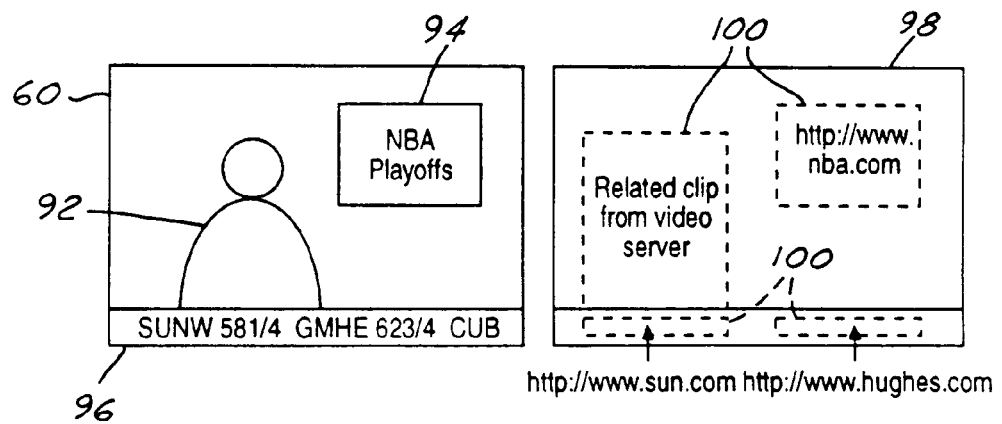
FIG. 8 is a diagram of the video frame and the corresponding imagemap.

Referring now to FIG. 8, an example shows a display screen 60 that has a news broadcast that contains an anchor 92, a sub-screen 94 that depicts sports scenes and a financial ticker 96 along with the corresponding imagemap 98 indicating the links 100 identified to the relevant portions of the screen.

Apart from the video, the audio can also contain certain parts which can have links associated with it. For example, consider the following audio section from a broadcast. "Today in New York, President Clinton addressed the Security Council of the United Nations." Any of the underlined terms in that audio can contain a link to a related information source. Audio may be a difficult media to hyperlink. One method for speech recognition is to utilize the closed captioning facility enabling specified words such as by underlining that can be selected by the user.

Another possibility for using audio information as a hyperlink is to utilize the audio signal in order to create a set of keywords that can be sent to a search engine to get related links. In this embodiment, there may not be a need to have related information source addresses sent along with the broadcast signal.

In a variant with a markup stream server, the markup stream associated with the broadcast stream is not transmitted with the video, audio and system streams. Instead, the markup stream is stored in a server along with an index that uniquely associates it with a specific video/audio segment. For example, the index can be the channel number and a time stamp indicating when the scene was shown. When the user commits an action such as the selection of an object, the action is transmitted through the communication channel to the server in some form and the stream server uses this information to locate the appropriate markup file and function. If the function involves the retrieval of related information, the markup stream server then requests the source provider to send the necessary documents to that particular user. Such an implementation will involve minimal modifications to the current broadcast streams. The disadvantage of this scheme is that of scalability. The database of markup streams will be very large depending upon the number of channels and a single server will have to process all of the requests.

As in the previous variant, another implementation also does not need an accompanying markup stream, however this variant is more limited in its functionality. The user can find related information by formulating keywords for a scene that can then be sent to a search engine. The search engine can return information about the various information repositories that will contain related data. The keyword string can be created either by analyzing the closed caption information or by analyzing the audio stream. In both cases, the interactivity control device should contain necessary processors that can parse the audio and closed caption streams. The advantage of this approach is that the related link information is not pre-defined. However, this approach requires a search engine, additional processing power to analyze audio or closed caption streams and more user action to get the desired information. In addition, this scheme does not provide a way to associate pre-defined links with signals.

An important component of the system is the generation of the markup stream content that corresponds to the functions associated with the selection of different video and audio objects. This requires a human element in the loop to determine the function associations with each object. Preferably, the selection of functions is performed automatically. The following methods will facilitate automation of this part of the systems.

The audio portion of the media stream can be input to a speech recognition engine, that can transcribe it to text. Current speech recognition systems can achieve high reliability, real time transcription. Language processing techniques can be employed on the output to generate keywords that are representative of the scene content. The keywords can now be utilized in a search engine to find the best links for that particular scene. Thus, the combination of speech recognition, language processing and keyword searches presents one method to generate markup stream content.

While it is difficult to analyze video to generate semantic information, video can nevertheless be utilized to assist with the context of the search. For example, information exists in video, which is not contained or referred to in the audio segment. Information such as dominant colors, camera work and motion information can easily be extracted by analyzing the video portion of the stream. This information can be used to augment the search. For example, if the audio segment refers to a car, by utilizing the color information from the video portion, the system can deduce what is the color of the car. Thus, information from the video data can also be used to assist the search process in the production of markup stream content.

The examples discussed herein are exemplary and the scope of the invention should not be limited to these examples. It should be understood that the foregoing description relates to certain preferred embodiments of the invention and that numerous variations and alternate embodiments will occur to those skilled in the art which may be made without departing from the spirit and scope of the invention as set forth in the following claims.

What is claimed is:

1. An interactive broadcast system comprising:
   a network operation center proxy coupled to a data source; and
   a terminal for receiving a data stream from said network operation center proxy and broadcasting an interactive broadcast signal, the interactive broadcast signal including a plurality of media channels and a multicast channel associated with each of the media channels;
   wherein each media channel includes a video stream and a markup stream;
   wherein the multicast channel is jointly shared by a plurality of users viewing the media channel via an address common to all of the plurality of users and the multicast channel transmits information identified by the markup stream and requested by any of the plurality of users to all of the plurality of users;
   wherein the interactive broadcast signal is received in a receiver having a cache for storing the information transmitted via the multicast channel to all of the plurality of users; and
   wherein the multicast channel and the media channel are not the same channel.

2. The system of claim 1, wherein said receiver having:
   a video/audio playback module,
   an interactivity module, and
   a communication module.

3. The system of claim 2, wherein said video/audio playback module comprises a broadcast stream decompression and playback device.

4. The system of claim 3, wherein said video/audio playback module comprises a video audio display device coupled to said broadcast stream decompression and playback device.

5. The system of claim 4, wherein said video/audio display device comprises a screen having a plurality of screen indicia.

6. The system of claim 5, wherein said screen indicia are selected from the group consisting of a control portion, a chat portion, a world wide web portion and a video portion.

7. The system of claim 2, wherein said interactivity module comprises an interactivity control device coupled to said video/audio playback module.

8. The system of claim 7, wherein said interactivity module comprises a user control device coupled to interactivity control device.

9. The system of claim 8, wherein said user control device comprises a remote control.

10. The system of claim 2, wherein said communications module comprises a network communication control device coupled to said interactivity module.

11. The system of claim 10, wherein said communications module comprises an interactive data display device coupled to said network communication control device.

12. The system of claim 1, wherein said network operations center proxy receives user action from one of the plurality of users comprising selection of an object in the video stream and generating the markup stream therefrom.

13. The system of claim 1, wherein said terminal comprises a multiplexer.

14. The system of claim 13, wherein said multiplexer multiplexes the multicast channel with the video stream and the markup stream from the network operation center proxy to form said interactive broadcast signal.

15. The system of claim 1, wherein said data source comprises the Internet.

16. The system of claim 1, wherein said terminal is an uplink center and a satellite for receiving the interactive broadcast signal and broadcasting said interactive broadcast signal to said receiver.

17. The system of claim 1, wherein the markup stream is responsive to a user request transmitted via the multicast channel and received by the network operation center proxy.

18. The system of claim 1, wherein a user request is transmitted via the multicast channel and information responsive to the user request is received via the multicast channel.

19. The system of claim 18, wherein the user request for the information is transmitted only if the information is not in the cache.

20. The method of claim 1, wherein
   the video stream comprises a plurality of video objects including selectable objects encoded by an object-based encoding syntax, and markup stream includes information identifying and specifying the selectable objects.

21. The system of claim 20, wherein the markup stream further comprises functions related to the selectable objects.

22. The system of claim 1, wherein the multicast channel is identified by an Internet Protocol (IP) address.

23. A method of broadcasting comprising the steps of:
identifying and specifying selectable objects from a broadcast signal;
generating a markup stream containing the identified and specified selectable objects; and
broadcasting an interactive broadcast signal comprising a plurality of media channels and a multicast channel associated with each of the media channels, wherein each media channel includes a video stream and the markup stream, the multicast channel jointly shared by a plurality of users viewing the media channel via an address common to all of the plurality of users, and the multicast channel for transmitting information identified by the markup stream and requested by any of the plurality of users to all of the plurality of users;
wherein the multicast channel and the media channel are not the same channel; wherein the step of broadcasting comprises the step of uplinking the interactive broadcast signal to a satellite and broadcasting the interactive signal from the satellite.

24. The method of claim 23 further comprising the steps of receiving the the interactive broadcast signal, demultiplexing the interactive broadcast signal and decompressing the interactive broadcast signal.

25. The method of claim 24, wherein in the step of receiving comprises the displaying screen indicia having selectable objects.

26. The method of claim 25, further comprising the step of selecting an object and thereby retrieving requested information from a data source.

27. The method of claim 26, further comprising the step of broadcasting the requested information.

28. The method of claim 26, wherein the step of retrieving requested information comprises retrieving information from a markup server.

29. The method of claim 25 further comprising the step of tracking data requests.

30. The method of claim 23, further comprising:
providing an input video stream;
analyzing said video stream to identify keywords; and
forming an object from the keywords.

31. The method of claim 23, wherein the multicast channel is identified by an Internet Protocol (IP) address.

32. A receiver comprising:
a playback module for receiving an interactive broadcast signal including a plurality of media channels and a multicast channel associated with each of the media channels, wherein each media channel includes a video stream and a markup stream, the multicast channel shared by a plurality of users viewing the media channel via an address common to all of the plurality of users, and the multicast channel for transmitting data identified by the markup stream and requested by any of the plurality of users to all of the plurality of users, wherein the multicast channel and the media channel are not the same channel;
an interactivity module coupled to said playback module, the interactivity module for deciphering the markup stream and accepting user input, and
a communication module coupled to said interactivity module.

33. The receiver of claim 32, wherein said playback module comprises a broadcast stream decompression and playback device.

34. The receiver of claim 33, wherein said playback module comprises a display device coupled to said broadcast stream decompression and playback device.

35. The receiver of claim 34, wherein said display device comprises a screen having a plurality of screen indicia.

36. The receiver of claim 35, wherein said screen indicia are selected from the group comprising a control portion, a chat portion, a World Wide Web portion and a video portion.

37. The receiver of claim 35, wherein said interactivity module comprises an interactivity control device coupled to said playback module.

38. The receiver of claim 37, wherein said interactivity module comprises a user control device coupled to interactivity control device.

39. The receiver of claim 38, wherein said user control device comprises a remote control.

40. The receiver of claim 32, wherein said communications module comprises a network communication control device coupled to said interactivity module.

41. The receiver of claim 40, wherein said communications module comprises an interactive data display device coupled to said network communication control device.

42. The receiver of claim 32, wherein the multicast channel is identified by an Internet Protocol (IP) address.

* * * * *